United States Patent [19]

Hedin

[11] 4,003,687

[45] Jan. 18, 1977

[54] PRESS PLATE HAVING HEATING MEANS AND ADAPTED FOR USE IN SINGLE-STOREY OR MULTI-STOREY PRESSES FOR THE MANUFACTURE OF FIBREBOARD, CHIPBOARD, LAMINARBOARD AND THE LIKE

[75] Inventor: Börje Vilhelm Hedin, Motala, Sweden

[73] Assignee: Aktiebolaget Motala Verkstad, Motala, Sweden

[22] Filed: June 9, 1975

[21] Appl. No.: 584,883

[30] Foreign Application Priority Data

June 13, 1974 Sweden .............................. 7407832

[52] U.S. Cl. .................................. 425/406; 249/79; 425/407

[51] Int. Cl.[2] ........................ B30B 15/06; B29J 5/08

[58] Field of Search ............... 249/79, 81; 425/338, 425/339, 406, 810, 40, 143, 20, 407; 169/169, 170, 164, 171; 100/295

[56] References Cited

UNITED STATES PATENTS

| | | | |
|---|---|---|---|
| 258,762 | 5/1882 | Hyatt | 169/170 X |
| 940,244 | 11/1909 | Friedenthal | 169/164 X |
| 1,550,185 | 8/1925 | Steenstrup | 169/171 X |
| 2,420,813 | 9/1947 | Camerota | 425/339 |
| 3,594,867 | 7/1971 | Pfeiffer | 425/143 |
| 3,830,459 | 8/1974 | Strausfeld | 425/810 X |
| R15,608 | 9/1923 | Burroughs | 425/810 X |

*Primary Examiner*—J. Howard Flint, Jr.
*Attorney, Agent, or Firm*—Dressler, Goldsmith, Clement, Gordon & Shore, Ltd.

[57] ABSTRACT

A press plate for presses used in the manufacture of fibreboard, chipboard, laminarboard and the like, in which heating of the press plate is effected by passing a heating medium, such as hot water, hot oil or steam, through passages in the press plate. The press plate comprises a center section having longitudinal passages therein and two end pieces which are welded to the center section. There are cast passages in the end sections which may intersect each other in two-level crossings. Desirably, the passages in the end sections are provided with curves at the corners of the end pieces.

7 Claims, 7 Drawing Figures

PRESS PLATE HAVING HEATING MEANS AND ADAPTED FOR USE IN SINGLE-STOREY OR MULTI-STOREY PRESSES FOR THE MANUFACTURE OF FIBREBOARD, CHIPBOARD, LAMINARBOARD AND THE LIKE

The present invention relates to press plates having heating means and adapted for use in presses for the manufacture of fibreboard, chipboard, laminarboard and the like, in which the press plate is heated by passing a heating medium through passages in the press plate, said heating medium normally being in the form of hot water, hot oil or steam.

Hitherto known press plates of such kind can be manufactured from plate sections in which a number of passages are suitably bored and which are welded together to form a press plate provided with a complete system of passages for the heating medium, without it being necessary to provide additional parts for the press plates. The system of passages can be oriented in the longitudinal direction of the plate and the number of inlets and outlets for the heating medium can normally be restricted to one of each. Thus, it has been possible to greatly reduce the number of external plugs for the system of passages in relation to previously known plate construction, although a relatively large number of internal plugs is unavoidable. It has been possible to obtain a certain degree of counter-flow movement of the heating medium through the plate, which has provided a relatively uniform plate temperature, although such counter-flow is incomplete. Press plates of the type described are used today in a very large number of the fibreboard presses known internationally and in a significant number of chipboard presses and laminar presses etc.

With the development of production processes and the increased requirements in regard of the capacity of said presses, a number of disadvantages have been found with the hitherto used arrangements.

The resistance to flow of the heating medium in the system of passages formed by the longitudinally extending and transversally extending passages is often so great as to be troublesome, owing to the unavoidable right-angle turns in the passage system, which means that the capacity of the pumps serving to circulate the heating medium must be greater and that the pumps must be capable of producing a considerable output power or, alternatively, that the heating capacity of the plate must be restricted.

With passage systems for conducting the heating medium through a press plate, the corners of the plate are often heated unsatisfactorily with respect to radiation losses etc., which results in the fact that the amount of heat required at the corners of the pressed goods to enable said corners to be treated uniformly with the remainder of said goods is not supplied to said corners rapidly enough. This can course a delay in the pressing process as a whole, or means that a poor board quality at the corners of the goods must be accepted.

External plugs, and in particular inner plugs for the passage systems of press plates constantly represent causes of error and expensive interruptions in operation. Consequently, it is highly desirable to eliminate these causes.

To facilitate operation of the press and the maintenance of the press during operation, it is important that the number of inlets and outlets for the heating medium is as small as possible and that said inlets and outlets are concentrated at one or both corners of the rear side of the press.

An object of the present invention is to eliminate at least substantially the beforementioned disadvantages and to satisfy requirements of operational reliability and ease of maintenance.

So that the invention will be more readily understood and further features thereof made apparent, an exemplary embodiment of the invention will now be described with reference to the drawing in which FIG. 1 shows a press plate provided with a heating system comprising a number of groups of passages, with five passages in each group, having a branched inlet and a branched outlet at each end of one long side of the press plate.

FIG. 5 shows the most desirable embodiment, when no other circumstances create an obstacle. FIGS. 3 and 4 show systems of passages in which the plate area is so great that the provision of only one inlet and one outlet for the heating medium is no longer favourable.

Figure 1:
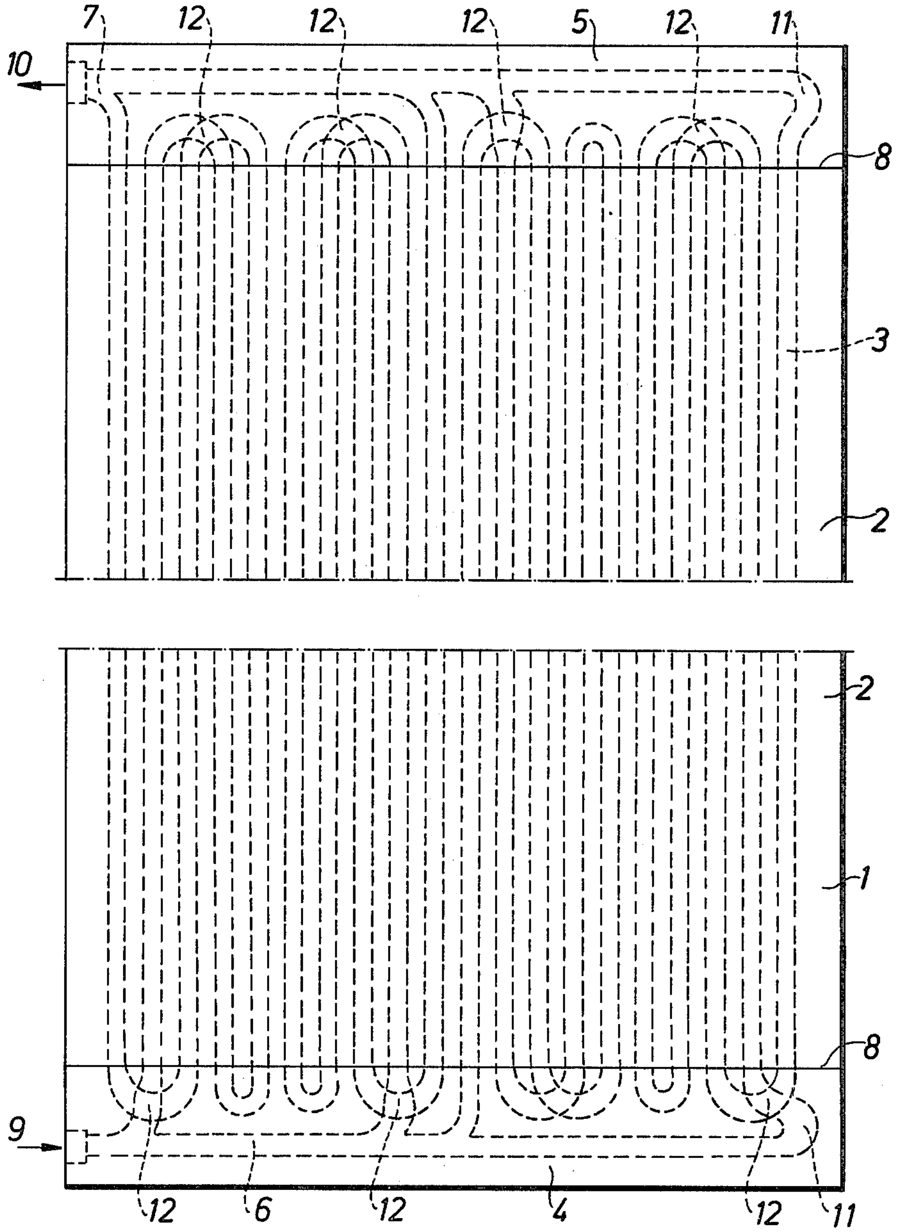
Figure 2:
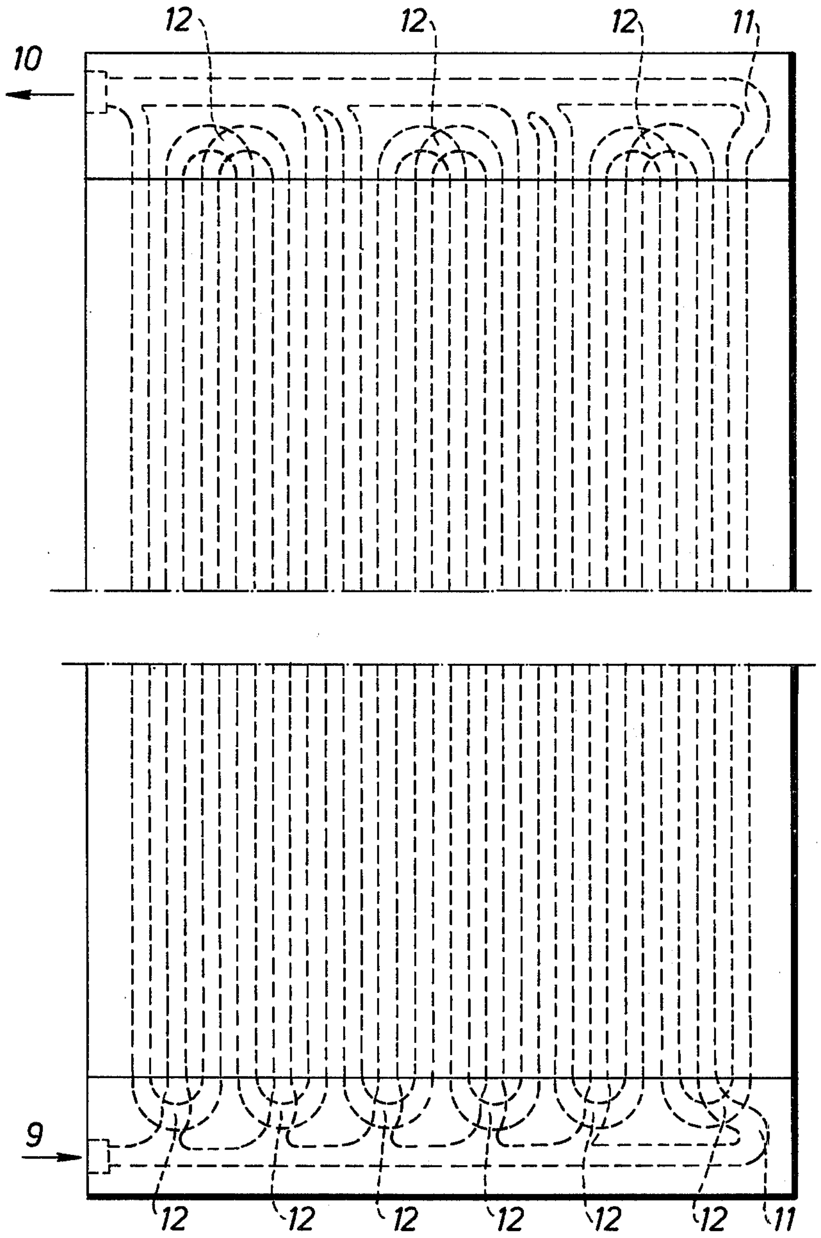
FIG. 2 shows a press plate provided with a heating system comprising a number of groups of passages with six passages in each group, having a branched inlet and a branched outlet at each end of one long side of the press plate.
Figure 3:
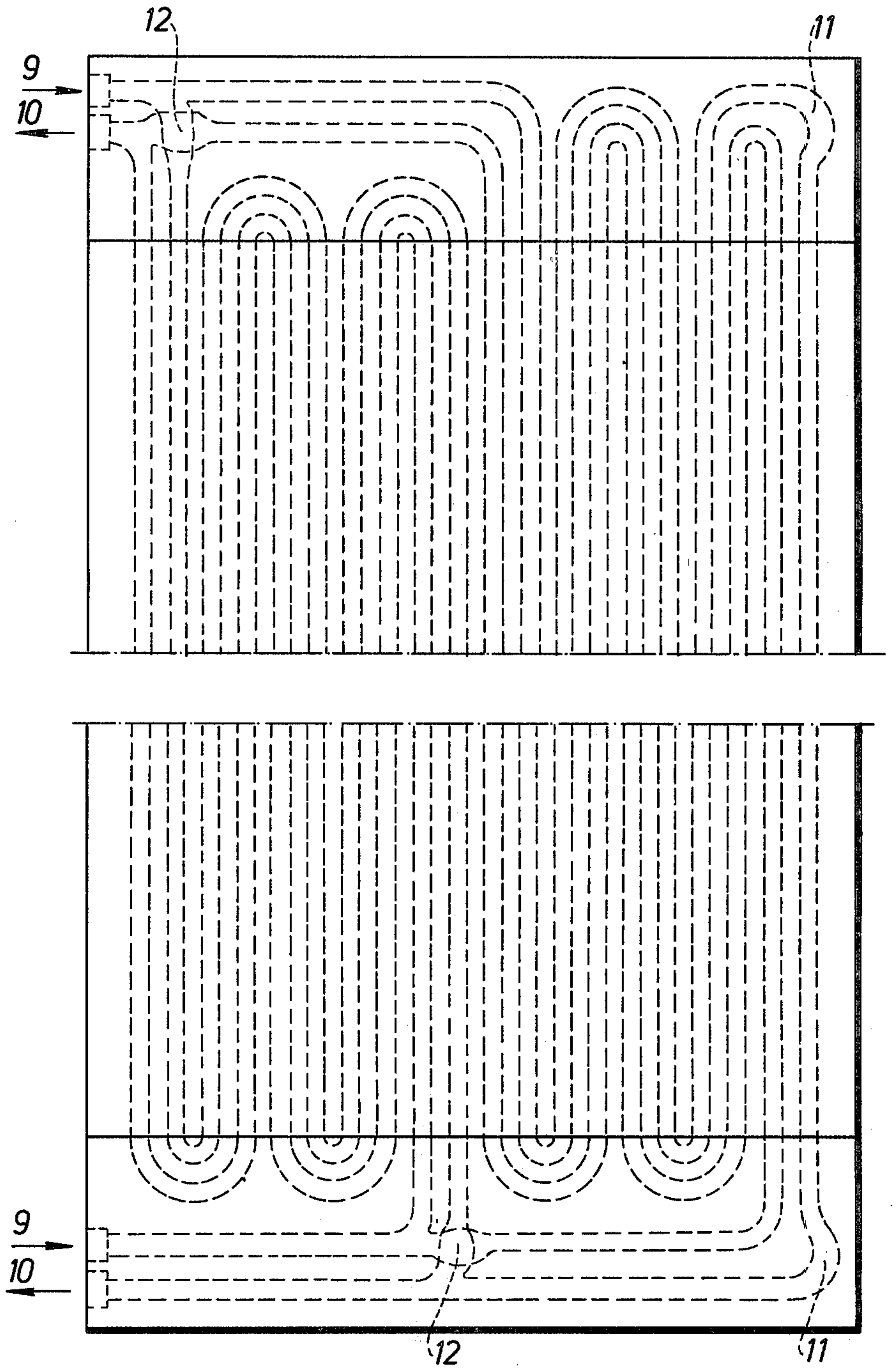
FIGS. 3 and 4 show a press plate provided with alternative heating systems, comprising a number of groups of passages with five passages in each group and having a branched inlet and branched outlet at each end of the press plate.
Figure 4:
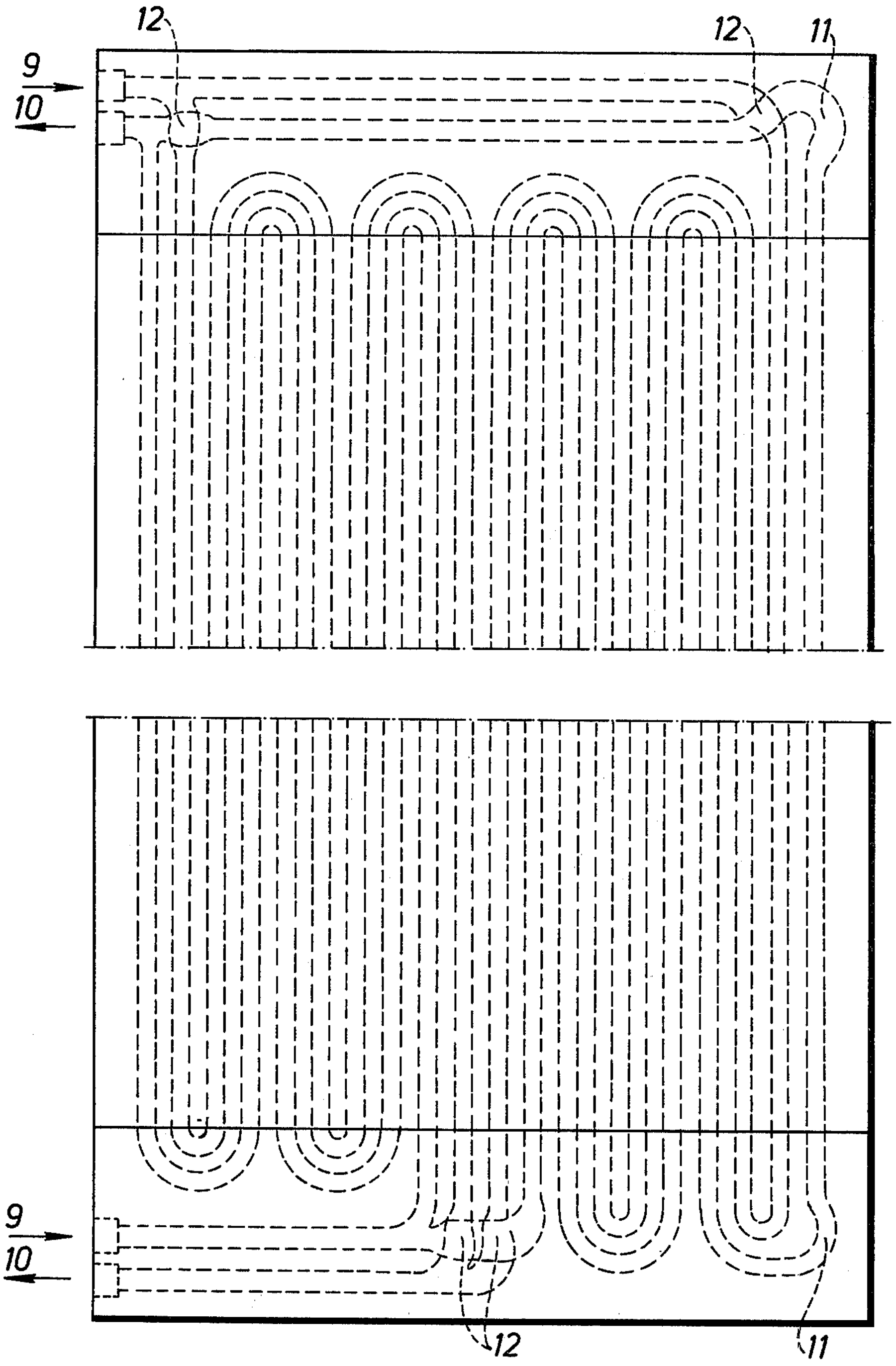
Figure 5:
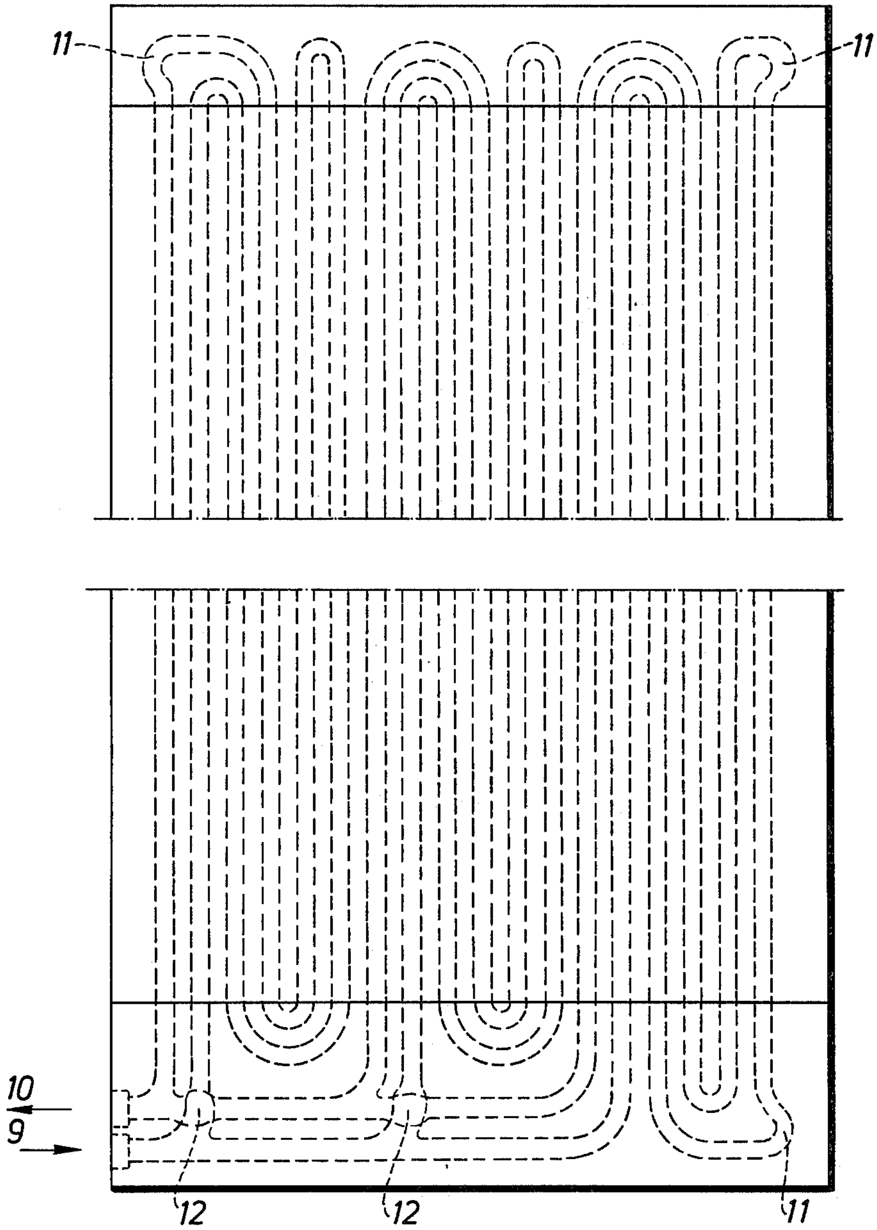
FIG. 5 shows a press plate provided with a heating system for perfect counter-flow of the heating medium, comprising a branched inlet and a branched outlet at one corner of the press plate.
Figure 6:
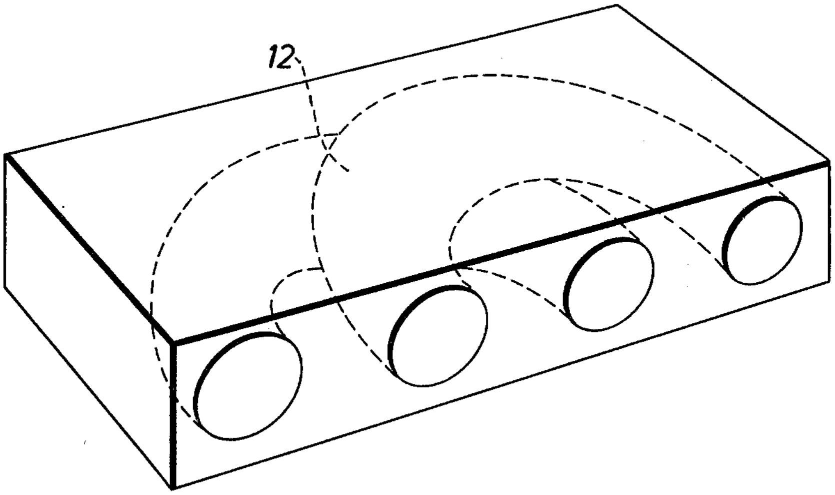
FIG. 6 is a perspective view of a point of intersection of two passages in and end piece of the press plate.
Figure 7:
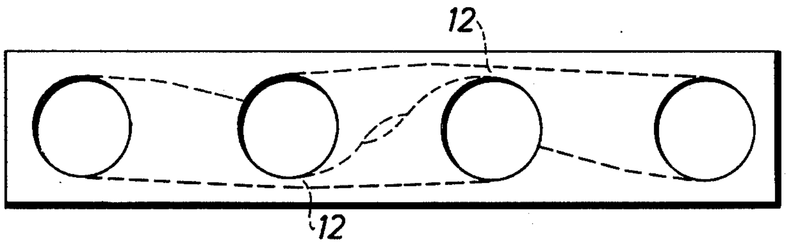
FIG. 7 is an end view of an intersection point between two passages in an end piece of a press plate.

In the drawings there is shown a press plate 1 which comprises a centre section 2 and two end pieces 4 and 5. The centre section 2 and the two end pieces 4 and 5 are welded together and the press plate 1 may comprise a single, coherent centre section 2 or a centre section which comprises a number of parts welded together. End pieces 4 and 5 join center section 2 along the separation lines 8 as shown in FIG. 1.

In a known manner, the centre section 2 comprises a preferably heavy-gauge steel plate provided with passages 3 for the heating medium. The two end pieces 4 and 5 are preferably made of chill-cast, steel castings in which passages 6 and 7 for the heating medium have been formed during the casting operation. Numerals 9 and 10 in the drawings indicate the flow direction of the heating medium at the inlets and outlets, respectively. When considered necessary, the passages may be permitted to cross each other at two-level crossings 12, this being made possible by the use of steel castings, said use being completely unconventional in similar constructions.

The orientation and design of the passages in the end pieces may be effected in a suitable manner with adapted passage dimensions and with large radii of curvature of the curved portions of the passages and, at the same time, so that the passages cover the whole area of the plate, including the corners thereof, where the passages are provided with special curves 11. The possibility of applying the counter-flow principal for heating medium in the different groups of passages to a greater extent than was possible with previously known constructions is afforded by the beforedescribed method of manufacture, which affects the uniformity of press plate temperature in a most favourable manner.

The invention is not restricted solely to press plates of the described type, but can also be applied with other type of similar devices.

I claim:

1. A press plate adapted to be heated to a generally uniform temperature for use with presses to manufacture board-like members, comprising: an elongated expansive center section having longitudinally opposed ends and spaced sides and defining a plurality of only longitudinal fluid-flow passages spaced generally in parallel relationship to each other for passage of a heating fluid between said ends to heat said press plate; a first end piece secured to one of said longitudinal ends, having spaced sides and defining a first set of looped passages fluidly connecting said longitudinal passages and defining an inlet at one of said sides for supplying fluid to said longitudinal passages to heat said first end piece; a second end piece secured to the other of said longitudinal ends, having spaced sides and defining a second set of looped passages fluidly connecting said longitudinal passages to heat said second end piece; and one of said end pieces defining an outlet for spent fluid passing through said longitudinal passages; and wherein said first end piece has a first corner at the side thereof opposite said inlet and defines a first curved fluid-flow passageway in flow communication with said longitudinal passages and adjacent said first corner to heat said first corner, and said second end-piece has a second corner at the side thereof longitudinally opposite said first corner and defines a second curved fluid-flow passageway in flow communication with said longitudinal passages and adjacent said second corner to heat said second corner.

2. A press plate in accordance with claim 1 wherein the looped passages of said first and second sets each define and are each located generally along a plane, said first set of looped passages being constructed and arranged to cross over each other in two-level crossings, and said second set of looped passages being constructed and arranged to cross over each other in two-level crossings.

3. A press plate in accordance with claim 2 wherein said inlet comprises a branched inlet.

4. A press plate in accordance with claim 2 wherein said outlet comprises a branched outlet.

5. A press plate in accordance with claim 2 wherein said second end-piece defines said outlet.

6. A press plate in accordance with claim 2 wherein each of said end-pieces each define an inlet and an outlet.

7. A press plate in accordance with claim 2 wherein said first end-piece defines a branched inlet and a branched outlet and said longitudinal passages are constructed and arranged for general counterflow of said heating fluid.

* * * * *